(12) United States Patent
King

(10) Patent No.: US 9,789,921 B2
(45) Date of Patent: Oct. 17, 2017

(54) VEHICLE TOW PLATFORM

(71) Applicant: Roy L King, Mooresboro, NC (US)

(72) Inventor: Roy L King, Mooresboro, NC (US)

(*) Notice: Subject to any disclaimer, the term of this patent is extended or adjusted under 35 U.S.C. 154(b) by 5 days.

(21) Appl. No.: 14/972,419

(22) Filed: Dec. 17, 2015

(65) Prior Publication Data

US 2016/0176361 A1     Jun. 23, 2016

Related U.S. Application Data

(60) Provisional application No. 62/094,419, filed on Dec. 19, 2014.

(51) Int. Cl.
    *B62D 63/06*     (2006.01)
    *B60P 3/06*     (2006.01)

(52) U.S. Cl.
    CPC .............. *B62D 63/062* (2013.01); *B60P 3/06* (2013.01)

(58) Field of Classification Search
    CPC .. B60P 3/077; B60P 3/122; B60P 3/07; B60P 3/075; B60P 3/08; B60P 3/06; B60P 3/079; B60P 7/12
    USPC .......... 410/30, 7, 19, 3, 10, 12, 105, 77, 91; 414/401, 400, 538, 477, 430, 462
    See application file for complete search history.

(56) References Cited

U.S. PATENT DOCUMENTS

| | | | | |
|---|---|---|---|---|
| 3,391,760 A | * | 7/1968 | Gonser | ..................... B60T 3/00 188/32 |
| 5,433,576 A | * | 7/1995 | Drew | ........................ B60P 1/43 414/343 |
| 7,581,623 B1 | * | 9/2009 | Egnor | ....................... B60T 3/00 188/32 |
| 8,474,561 B2 | * | 7/2013 | Allingham | ................ B60R 9/06 180/89.11 |

* cited by examiner

*Primary Examiner* — Glenn Dayoan
*Assistant Examiner* — Sunsurraye Westbrook
(74) *Attorney, Agent, or Firm* — J. M. Robertson, LLC

(57) ABSTRACT

A vehicle tow platform adapted for mounting on a two-wheeled trailer or dolly. The vehicle tow platform includes at least one platform segment adapted to support a wheeled vehicle. An upwardly projecting wall segment positioned forward of the platform segment is adapted to block forward rolling of the wheeled vehicle.

18 Claims, 9 Drawing Sheets

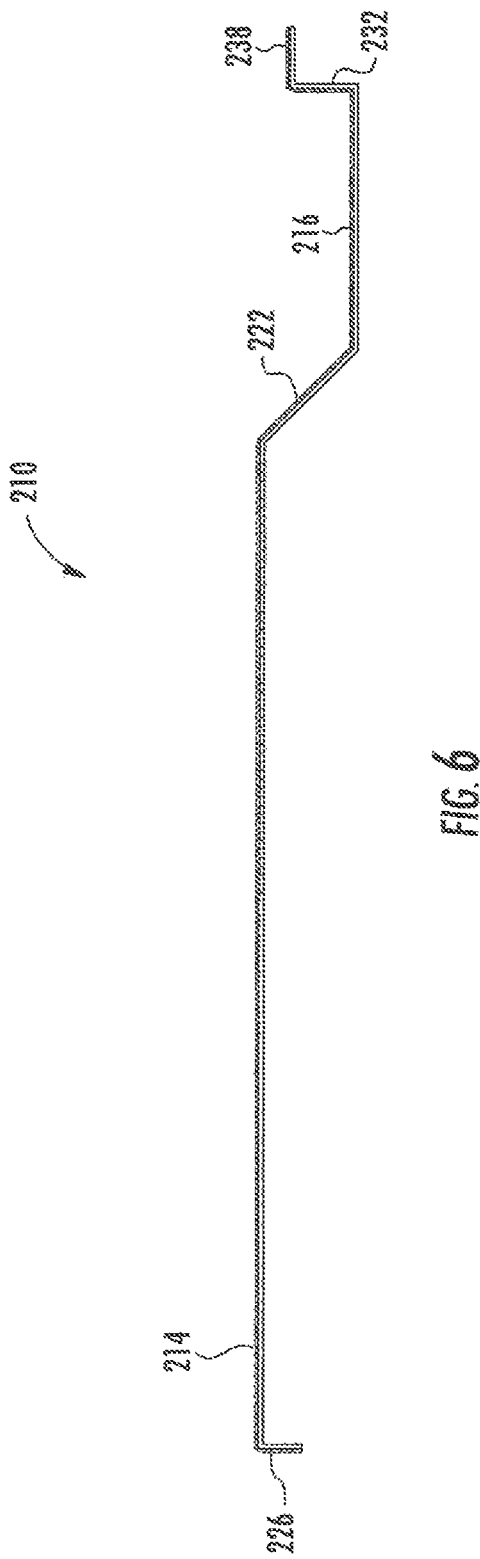

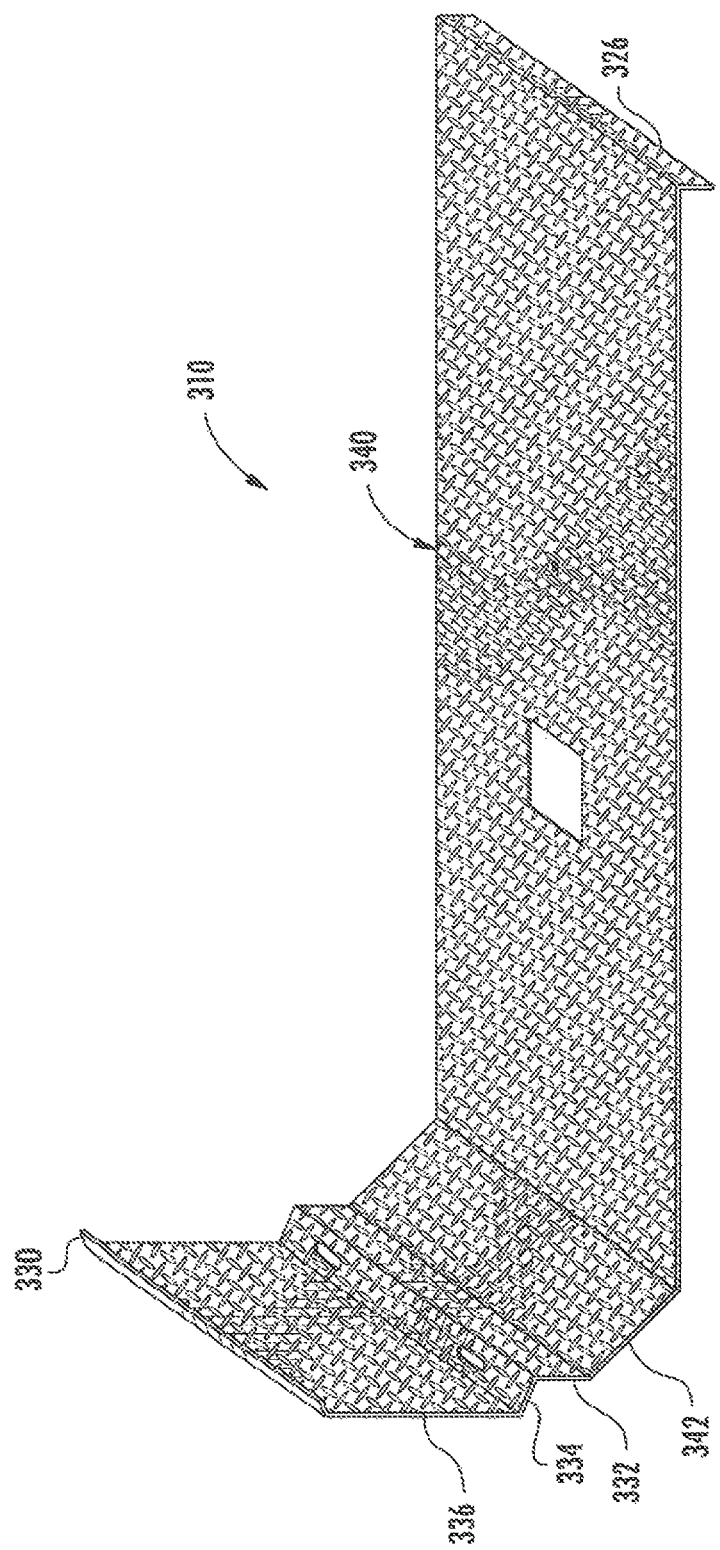

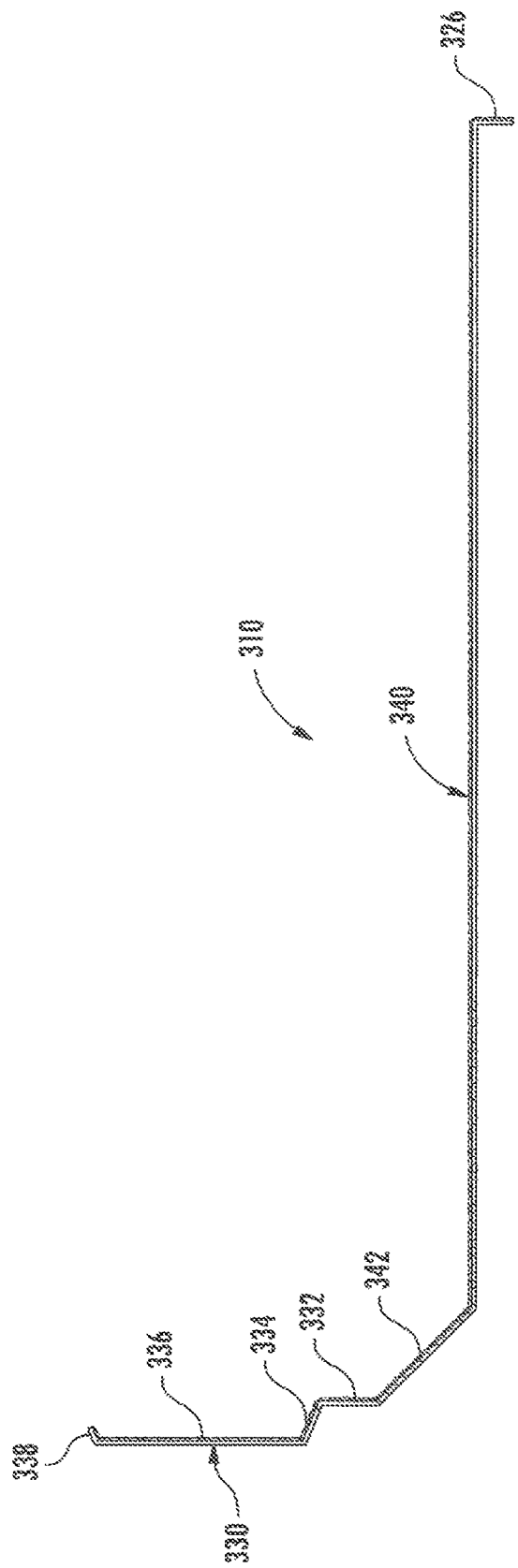

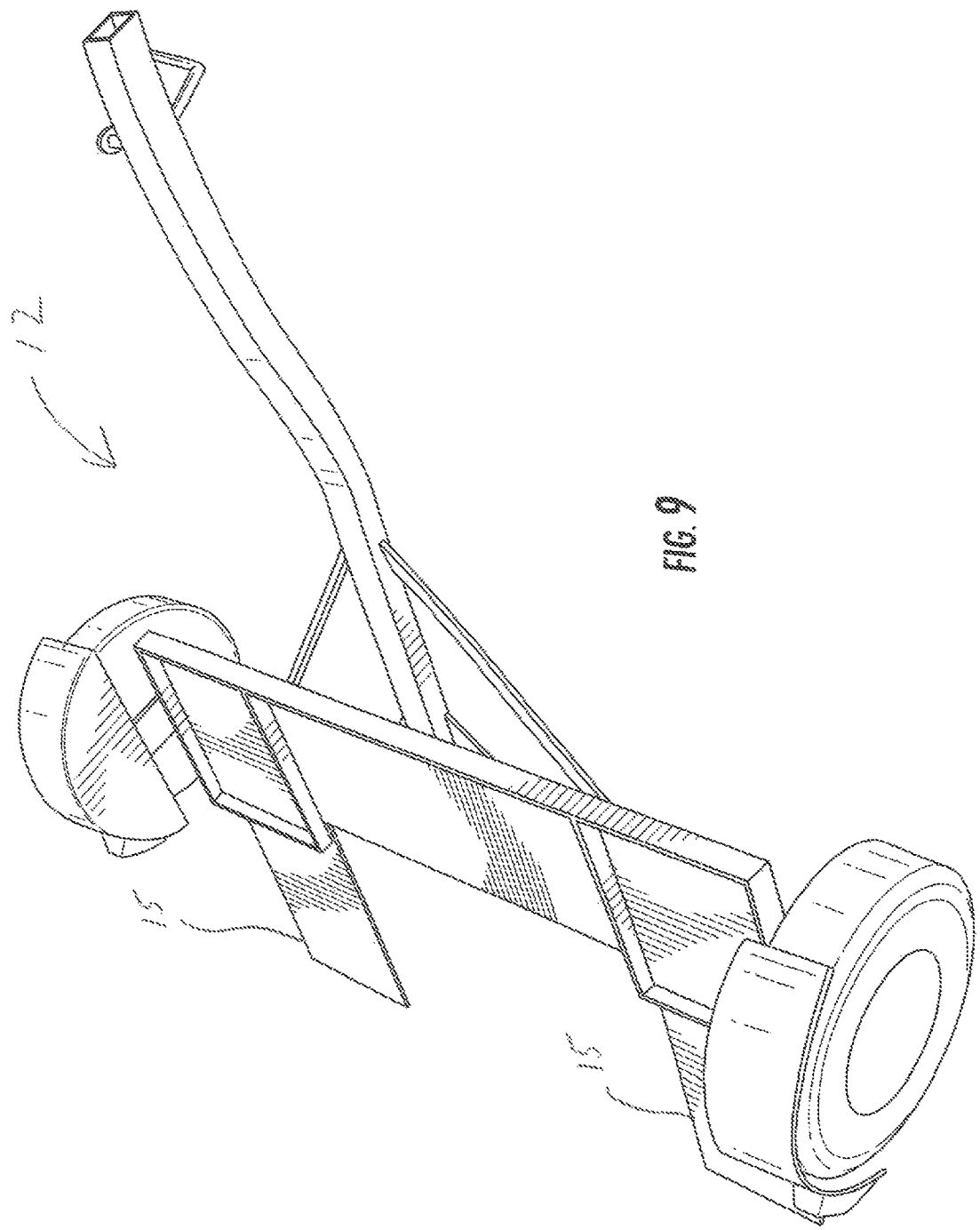

VEHICLE TOW PLATFORM

CROSS-REFERENCE TO RELATED APPLICATIONS

This non-provisional application claims the benefit of, and priority from U.S. provisional application 62/094,419 having a filing date of Dec. 19, 2014. The contents of such earlier application are hereby incorporated by reference in their entirety as if set forth fully herein.

TECHNICAL FIELD

The present disclosure relates generally to tow trailers or dollies. More particularly, the present disclosure relates to modular platforms for use in supporting wheeled vehicles on tow trailers and dollies during transportation.

BACKGROUND

It is well known to use tow trailers and dollies for the transportation of vehicles. Such tow trailers and dollies have two basic configurations. In a first known configuration, an extended trailer has a generally flat upper segment which can be tilted during loading and unloading such that the vehicle to be towed can be driven or pushed on and off the trailer segment. When using such a trailer, the vehicle must be secured in place such that it will not roll off of the trailer during the towing operation. Moreover, the entire trailer must be manipulated during the loading and unloading procedure which may require substantial physical strength. In a second known configuration, a tow dolly is used to support only the front wheels of the vehicle to be towed. However, such a dolly is not practical for transportation of many vehicles such as motorcycles, ATVs or the like. Accordingly, an improved towing system which is easy to use and which is compatible with vehicles of all types would be desirable.

SUMMARY OF THE DISCLOSURE

The present disclosure offers advantages and alternatives over the prior art by providing an easily manipulated vehicle support platform which may used in conjunction with known trailers and dollies to support substantially any wheeled vehicle during a towing operation. The support platform is preferably of unitary body construction formed from a single piece of metal or the like. A vehicle support platform consistent with the present disclosure may be used on a trailer, dolly, boat trailer, car dolly or the like that does not have the flooring configuration to support a vehicle being towed such as golf carts, four wheelers, motorcycles or the like. Thus, a vehicle support platform consistent with the present disclosure permits such trailer and dolly configurations to be adapted to support vehicles being towed. In each representative embodiment, the vehicle support platform permits proper forward and rearward weight adjustment of the vehicle being towed. This weight adjustment prevents undesirable excessive weight on the hitch and also avoids excessive weight at the rear which may lead to swaying during use.

In one exemplary practice, the vehicle support platform has a vehicle support segment of stepped construction which includes a raised platform segment positioned between an adjacent forward platform segment and an adjacent rear platform segment. In use, the raised platform segment may be oriented in overlying nested relation to a tow dolly axle. The front wheel(s) of a supported vehicle will be supported at the forward platform segment which defines a depressed wheel well. The rear wheel(s) of the supported vehicle may be supported at the rear platform segment at an elevation above the front wheels.

In another exemplary practice, the vehicle support platform has a vehicle support segment of substantially planar construction which can be mounted in overlying relation to a two-wheeled tow trailer having one or more extensions projecting rearward from a trailer cross-member positioned between the wheels. By hooking over the ends of the extensions, the planar vehicle support segment provides a planar support which can be easily tilted to a downward position for vehicle loading and which will pivot up to an operating position as the vehicle is moved forward.

Other features and advantages of the disclosure will become apparent to those of skill in the art upon review of the following detailed description, claims and drawings.

BRIEF DESCRIPTION OF THE DRAWINGS

FIG. 6 is a schematic side view of the vehicle tow platform of FIG. 5;

FIG. 7 is a schematic perspective view illustrating another exemplary embodiment of a vehicle tow platform consistent with the present disclosure;

FIG. 8 is a schematic side view of the vehicle tow platform of FIG. 7; and

FIG. 9 is a schematic view illustrating one form of exemplary trailer for use with a vehicle tow platform consistent with the present disclosure.

Figure 1:
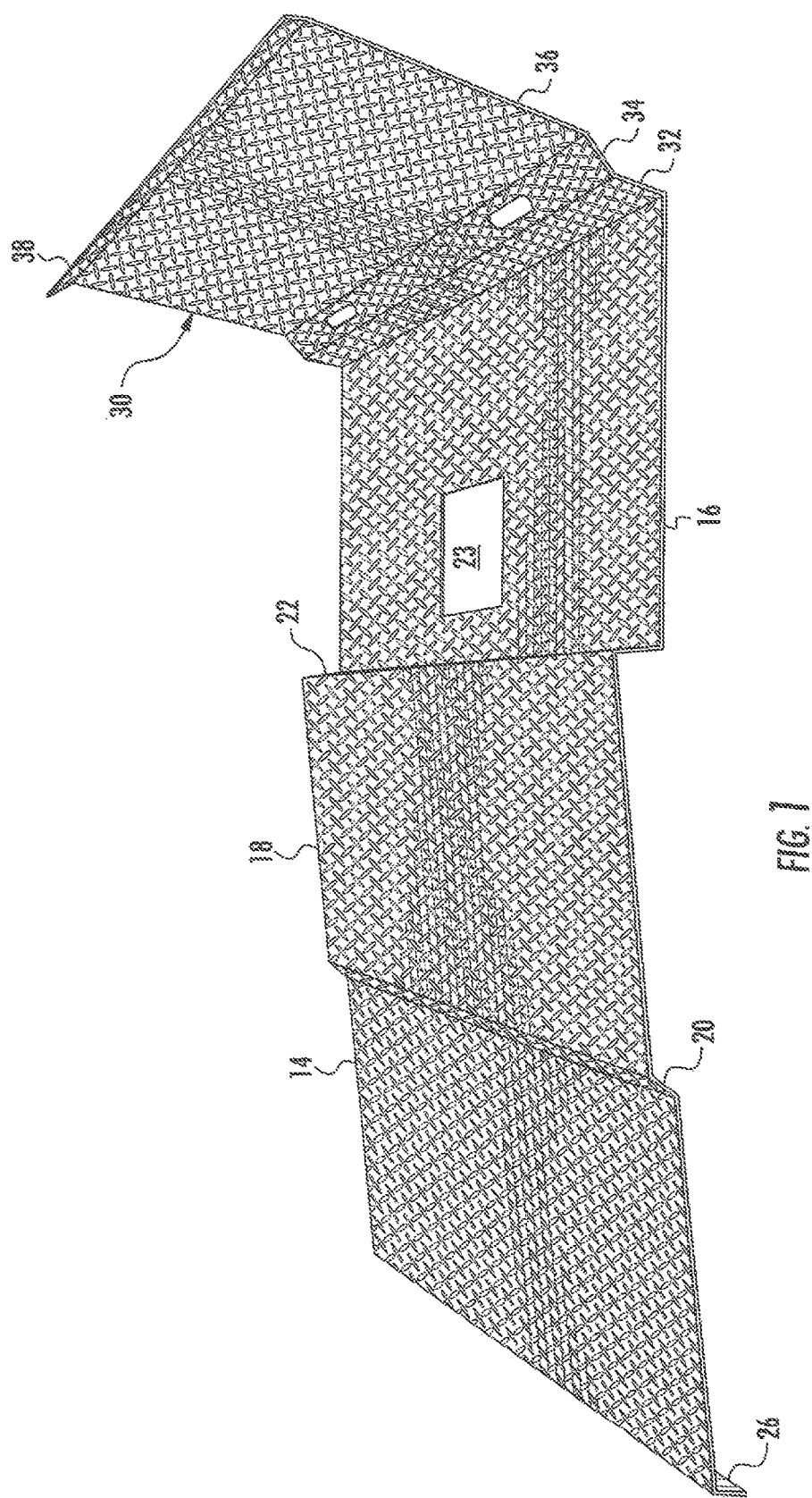
FIG. 1 is a schematic perspective view illustrating a first exemplary embodiment of a vehicle tow platform consistent with the present disclosure.

It is to be understood that the disclosure is in no way limited in its application or construction to the details and the arrangements of the components set forth in the description or illustrated in the drawings. Rather, the present disclosure is capable of other embodiments and of being practiced or being carried out in various ways. Also, it is to be understood that the phraseology and terminology used herein are for purposes of description only and should not be regarded as limiting. The use herein of terms such as "including" and "comprising" and variations thereof is meant to encompass the items listed thereafter and equivalents thereof as well as additional items and equivalents thereof.

DETAILED DESCRIPTION OF PREFERRED EMBODIMENTS

Figure 2:
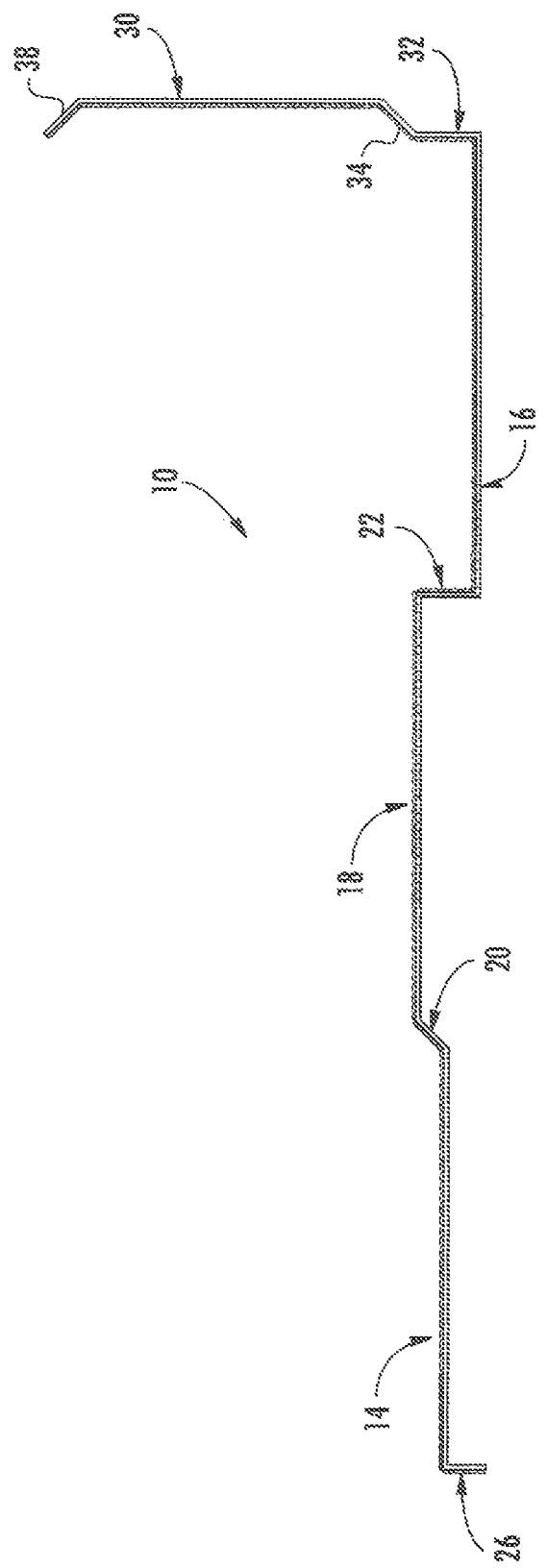
FIG. 2 is a schematic side view of an exemplary tow platform as illustrated in FIG. 1.
Figure 3:
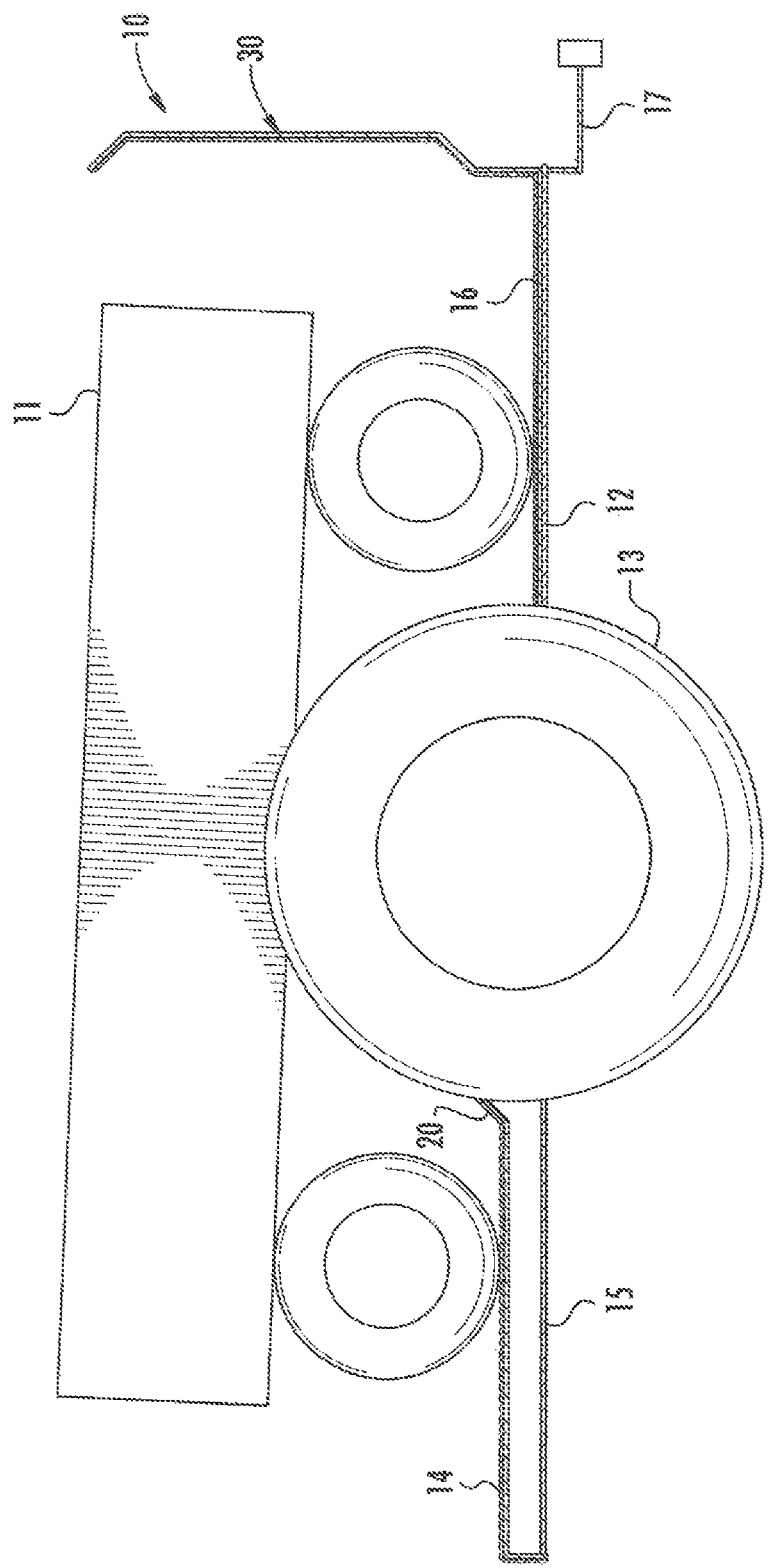
FIG. 3 is a schematic view illustrating a wheeled vehicle supported on an exemplary tow platform as illustrated in FIG. 1.

Reference will now be made to the drawings, wherein to the extent possible, like elements are designated by like reference numerals in the various views. Referring now jointly to FIGS. 1-3, an exemplary embodiment of a vehicle tow platform 10 is illustrated supporting a wheeled vehicle 11 in overlying relation to a wheeled trailer or dolly 12 (FIG. 3). In this regard, the tow platform rests on top of the trailer or dolly 12 which can have any suitable structure. By way of example only, the trailer or dolly may have a relatively simple two-wheel structure with a cross member extending between two wheels 13. One or more support elements 15 may project rearwardly away from the cross member. In this regard, in one exemplary practice, a pair of support elements 15 in the form of arms or plates may project rearwardly in spaced relation to one another on opposing lateral sides of the trailer or dolly 12 such that the center of the trailer or dolly 12 rearward of the wheels and between the support members is substantially open (FIG. 9). Of course, a support member 15 may also extend across the full width of the trailer or dolly 12 if desired. The trailer or dolly 12 will also typically include a forward projecting hitching neck 17 adapted to engage a corresponding trailer hitch on a tow vehicle (not shown).

It is to be understood that the wheeled vehicle 11 supported on the vehicle tow platform 10 may be of any form having at least one front wheel and at least one rear wheel. By way of example only, and not limitation, such vehicles may include motorcycles, bicycles, three-wheelers, cars, trucks, golf carts, ATVs and the like. Moreover, while only a single wheeled vehicle 11 is illustrated, it is also contemplated that multiple vehicles may be carried simultaneously if desired.

The vehicle tow platform 10 may be a single piece structure of substantially uniform thickness formed from a suitable sheet metal such as steel, aluminum or the like. The sheet metal is formed to a desirable shape by stamping or other suitable processes. Composite materials such as carbon fiber reinforced resins and the like may also be used. Of course, the vehicle tow platform may also be formed by joining together individual components using processes such as welding or the like as will be well known. The upper surface of the tow platform may include a checker pattern as will be well known to those of skill in the art to provide additional traction during use.

As shown, in the exemplary embodiment of FIGS. 1 and 2, the vehicle tow platform 10 may have a generally stepped profile which includes a rear platform segment 14 having a length of about 26.5 inches defining a rear wheel support surface. The illustrated vehicle tow platform 10 also includes a forward platform segment 16 having a length of about 29 inches defining a forward wheel support surface in the form of a depressed wheel well. A raised intermediate platform segment 18 is positioned between the forward platform segment 16 and the rear platform segment 14. As illustrated, the raised intermediate platform segment 18 preferably includes an angled rear face 20 having an angle of about 45 degrees which may have a length of about 2.5 inches. The raised intermediate platform segment 18 preferably also includes a front face 22 having an angle of about 90 degrees and which may have a length of about 3.75 inches. During use, the raised intermediate platform segment 18 may be positioned in generally overlying nested relation to a cross member between the wheels 13. The angled rear face 20 facilitates loading the vehicle 11 by rolling the front wheels over the intermediate platform segment 18. Once loading has occurred, the rear face 22 is used to substantially block rearward rolling movement. Moreover, the forward platform segment 16 is at a depressed elevation relative to the rear platform segment 14, thereby urging the wheeled vehicle 11 forward during use such that the chance of roll-back is further reduced. One or more openings 23 in the forward platform segment provide access to the trailer for hook-up. In this regard, a single substantially square or rectangular opening disposed substantially at the center-line of the forward platform segment 16 may be used, although other constructions may likewise be suitable.

As shown, in the exemplary embodiment of FIGS. 1-3, the vehicle tow platform 10 may include a rear lip 26 which may have an angle of about 90 degrees and a length of about 2.5 inches. During use, the rear lip 26 is positioned adjacent to the distal ends of support elements 15 on the trailer or dolly 12 to facilitated proper positioning. In the illustrated exemplary construction, a tongue guard 30 may be positioned adjacent to the forward platform segment 16. The tongue guard 30 may include a lower wall 32 having an angle of about 90 degrees and a length of about 4 inches. In the illustrated exemplary construction, an intermediate angled segment 34 extends away from an upper edge of the lower wall 32 at an angle of about 45 degrees. A vertical tongue segment 36 projects upwardly away from the intermediate angled segment 34 at an angle of about 90 degrees. The vertical tongue segment 36 may have an extended length of about 19 inches. An upper lip 38 having a length of about 3 inches may be angled rearwardly away from the vertical tongue segment 36. As will be appreciated, the tongue guard 30 acts to prevent forward rolling of the vehicle and protects the vehicle pulling the trailer (not shown).

Figure 4:
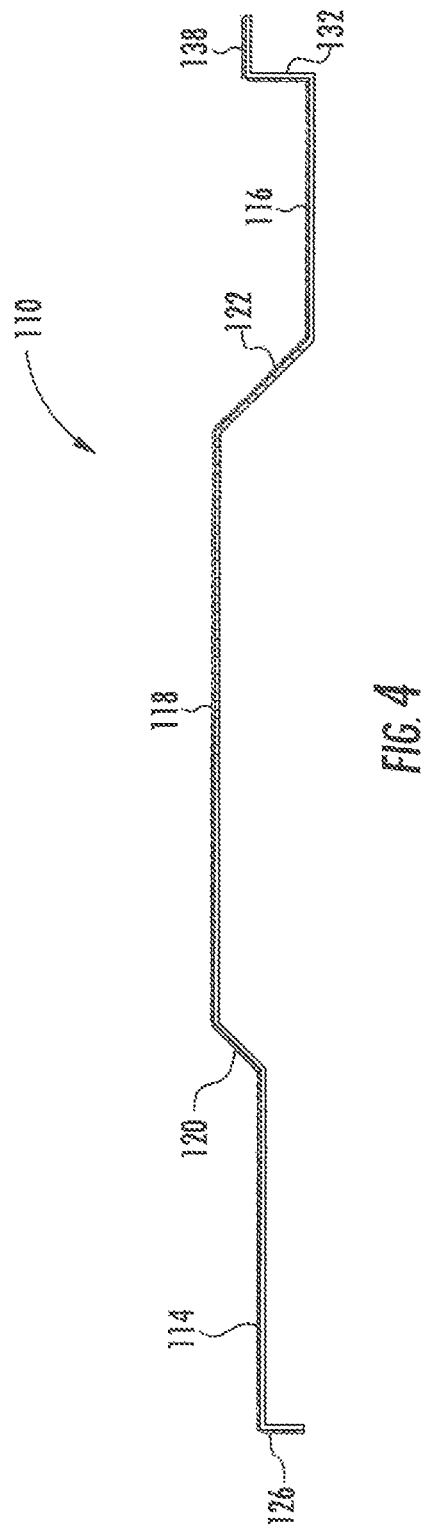
FIG. 4 is a schematic side view illustrating an exemplary tow platform similar to FIG. 1, but without the front tongue guard.

FIG. 4 illustrates an alternative construction for a vehicle tow platform 110 consistent with the present disclosure, wherein like elements to those described previously are designated by like reference numerals within a 100 series. As shown, in the exemplary embodiment of FIG. 4, the vehicle tow platform 110 may have a generally stepped profile which includes a rear platform segment 114 having a length of about 26.5 inches defining a rear wheel support segment. The illustrated vehicle tow platform 110 also includes a forward platform segment 116 having a length of about 14 inches defining a forward wheel support segment in the form of a depressed wheel well. A raised intermediate platform segment 118 is positioned between the forward platform segment 116 and the rear platform segment 114. As illustrated, the raised intermediate platform segment 118 preferably includes an angled rear face 120 having an angle of about 45 degrees which may have a length of about 2.5 inches. The raised intermediate platform segment 118 preferably also includes a front face 122 having an angle of about 45 degrees and which may have a length of about 3.5 inches. As shown, the forward platform segment 116 is depressed in relation to the rear platform segment 114. One or more openings in the forward platform segment 116 provides access to the trailer for hook-up.

As shown, in the exemplary embodiment of FIG. 4, the vehicle tow platform 110 may include a rear lip 126 which may have an angle of about 90 degrees and a length of about 2.5 inches. During use, the rear lip 126 is positioned adjacent to the distal ends of support elements projecting rearward on the trailer or dolly to facilitated proper positioning. In the illustrated exemplary construction, a forward wall 132 having a length of about 4 inches may project upwardly from the end of the forward platform segment 116 at an angle of about 90 degrees. A forwardly projecting lip 138 having a length of about 4 inches may extend forward at substantially a right angle to the top of the forward wall 132.

Figure 5:
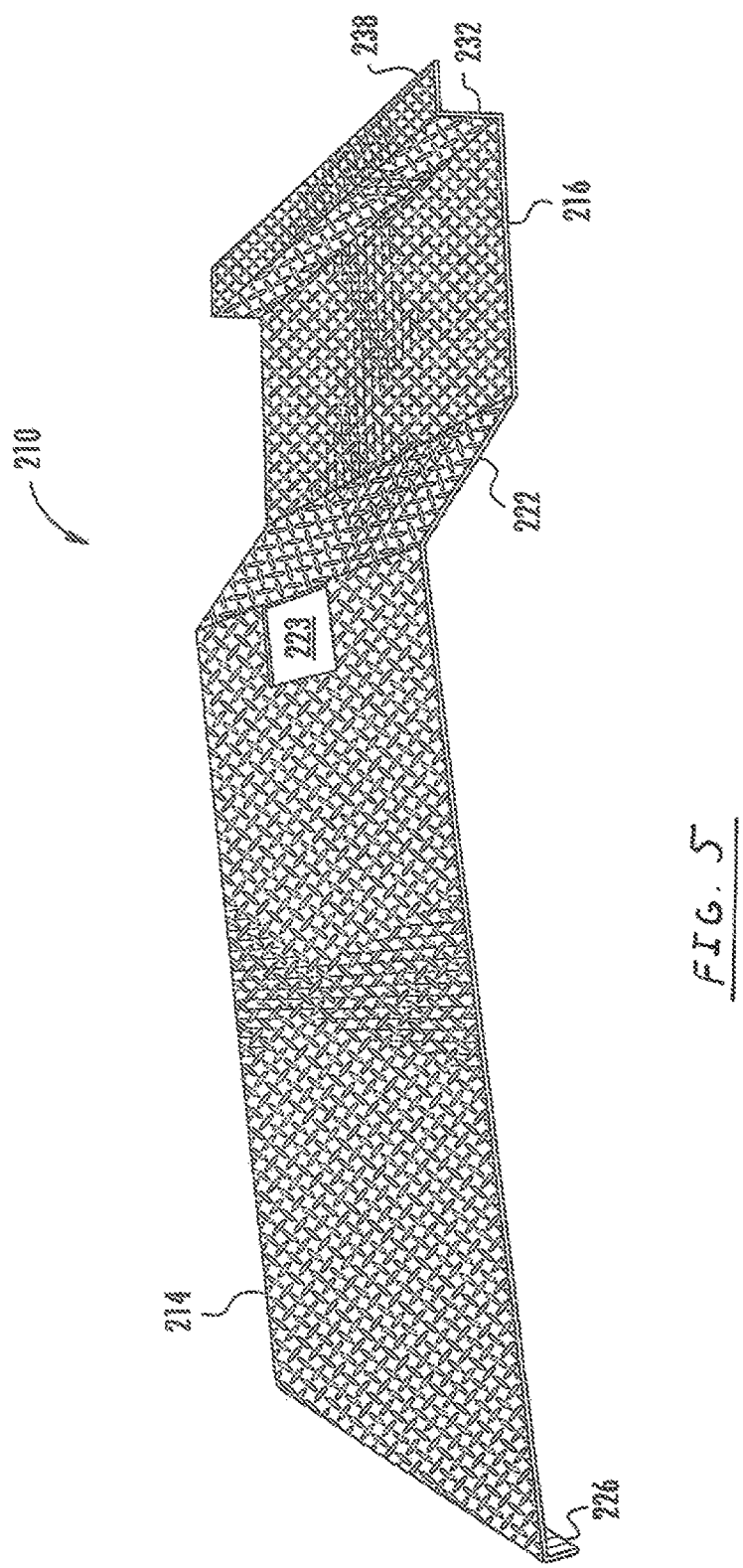
FIG. 5 is a schematic perspective view illustrating another exemplary embodiment of a vehicle tow platform consistent with the present disclosure.

FIGS. 5 and 6 illustrate an alternative construction for a vehicle tow platform 210 consistent with the present disclosure, wherein like elements to those described previously are designated by like reference numerals within a 200 series. As shown, in the exemplary embodiment of FIGS. 5 and 6, the vehicle tow platform 210 may have a generally stepped profile which includes a rear platform segment 214 having a length of about 61 inches defining a rear wheel support segment. The illustrated vehicle tow platform 210 also includes a forward platform segment 216 having a length of about 16 inches defining a forward wheel support segment in the form of a depressed wheel well. As illustrated, the rear platform segment 214 preferably includes an angled front face 222 having an angle of about 45 degrees and which may have a length of about 8 inches. As shown, the forward platform segment 216 is depressed in relation to the rear platform segment 214. One or more openings in the rear platform segment 214 provide access to the trailer for hook-up. In this regard, a single substantially square or rectangular opening 223 disposed substantially at the centerline of the forward platform segment 16 may be used, although other constructions may likewise be suitable.

As shown, in the exemplary embodiment of FIGS. 5 and 6, the vehicle tow platform 210 may include a rear lip 226 which may have an angle of about 90 degrees and a length of about 2.5 inches. During use, the rear lip 226 is positioned adjacent to the distal ends of support elements projecting rearward on the trailer or dolly to facilitated proper positioning. In the illustrated exemplary construction, a forward wall 232 having a length of about 4 inches may project upwardly from the end of the forward platform segment 216 at an angle of about 90 degrees. A forwardly projecting lip 238 having a length of about 4 inches may extend forward at substantially a right angle to the top of the forward wall 232.

FIGS. 7 and 8 illustrate an alternative construction for a vehicle tow platform 310 consistent with the present disclosure, wherein like elements to those described previously are designated by like reference numerals within a 300 series. As illustrated, in this exemplary embodiment, the vehicle tow platform 310 has a vehicle support platform segment 340 of substantially planar (non-stepped) construction which can be mounted in overlying relation to a two-wheeled tow trailer having one or more extensions projecting rearward from a trailer cross-member positioned between the wheels. As shown, in the exemplary embodiment of FIG. 26, the vehicle tow platform 310 may have a generally planar vehicle support platform segment 340 having a length of about 83 inches defining a substantially planar support segment for both front and rear wheels of a vehicle (not shown). The vehicle support platform segment 340 may include one or more openings to provide access to the trailer for hook-up.

As shown, in the exemplary embodiment of FIG. 26, the vehicle tow platform 310 may include a rear lip 326 which may have an angle of about 90 degrees and a length of about 2.5 inches. During use, the rear lip 326 is positioned adjacent to the distal ends of support elements on the trailer or dolly to facilitated proper positioning. In the illustrated exemplary construction, a tongue guard 330 may be positioned adjacent to the forward end of vehicle support platform segment 340. The tongue guard 330 may include a proximal angled wall segment 342 having an angle of about 45 degrees and a length of about 9.5 inches. A lower vertical wall 332 having an angle of about 90 degrees and a length of about 4 inches may project upwardly from proximal angled wall segment 342. An intermediate angled segment 334 extends away from an upper edge of the lower wall 332 at an angle of about 45 degrees. A vertical tongue segment 336 projects upwardly away from the intermediate angled segment 334 at an angle of about 90 degrees. The vertical tongue segment 336 may have an extended length of about 14.5 inches. An upper lip 338 may be angled rearwardly away from the vertical tongue segment 336 at an angle of about 45 degrees. As will be appreciated, the tongue guard 330 acts to prevent forward rolling of the vehicle and protects the vehicle pulling the trailer (not shown).

A common feature of each of the described embodiments is that the center of gravity of the tow platform may be set so as to cause the tow platform to tilt downwardly at the rear prior to vehicle loading. As a vehicle 11 is loaded, the tow platform is urged to tilt forward until reaching the final operating position. Likewise, as the vehicle 11 is unloaded, the tow platform will tilt progressively down to facilitate unloading. Thus, vehicles may be loaded and unloaded with relative ease.

Of course, variations and modifications of the foregoing are within the scope of the present disclosure. It is to be understood that the disclosure herein extends to all alternative combinations of two or more of the individual features mentioned or evident from the text and/or drawings. All of these different combinations constitute various alternative aspects of the present disclosure. The embodiments described herein will enable others skilled in the art to utilize the contents of the disclosure. The claims are to be construed to include alternative embodiments to the fullest extent permitted by the prior art.

What is claimed is:

1. A vehicle tow platform adapted for mounting on a two-wheeled trailer or dolly, the vehicle tow platform comprising: a first platform segment adapted to support at least one rear wheel of a wheeled vehicle; a substantially vertical rear lip projecting downwardly away from a rear end of the first platform segment, wherein the vertical rear lip defines a proximal end of the vehicle tow platform; and an upwardly projecting wall segment positioned forward of the first platform segment, the upwardly projecting wall segment being adapted to block forward rolling of the wheeled vehicle, wherein the tow platform is of one-piece, metal construction having a substantially uniform thickness, and wherein the vehicle tow platform includes at least one opening disposed substantially along a longitudinal centerline of the vehicle tow platform to provide access to the trailer or dolly during use.

2. The vehicle tow platform as recited in claim 1, wherein the vehicle tow platform is of stamped construction.

3. The vehicle tow platform as recited in claim 2, wherein an upper surface of the first platform segment includes a checker pattern.

4. The vehicle tow platform as cited in claim 3, wherein the vehicle tow platform is steel.

5. The vehicle tow platform as recited in claim 3, wherein the vehicle tow platform is aluminum.

6. The vehicle tow platform as recited in claim 1, further comprising a second platform segment adapted to support at least one forward wheel of the wheeled vehicle, wherein the second platform segment is depressed relative to the first platform segment such that the second platform segment is at a lower elevation than the first platform segment.

7. The vehicle tow platform as recited in claim 6, further comprising a raised intermediate platform segment disposed in raised relation between the first platform segment and the second platform segment.

8. The vehicle tow platform as recited in claim 7, wherein an angled face extends between the first platform segment and the raised intermediate platform segment.

9. The vehicle tow platform as recited in claim 8, wherein the angled face has an angle of about 45 degrees and a length of about 2.5 inches.

10. The vehicle tow platform as recited in claim 8, wherein a substantially vertical face extends between the second platform segment and the raised intermediate platform segment.

11. The vehicle tow platform as recited in claim 10, wherein the substantially vertical face has a length of about 3.75 inches.

12. The vehicle tow platform as recited in claim 1, further comprising a tongue guard projecting upwardly away from the upwardly projecting wall segment, wherein the tongue guard includes a substantially vertical tongue segment having a length of at least about 12 inches.

13. The vehicle tow platform as recited in claim 12, further comprising an upper lip projecting away from the substantially vertical tongue segment in a direction towards the proximal end of the vehicle tow platform.

14. A vehicle tow platform adapted for mounting on a two-wheeled trailer or doily, the vehicle tow platform comprising: a single platform segment adapted to support at least one rear wheel of a wheeled vehicle and at least one front wheel of the wheeled vehicle; a substantially vertical rear lip projecting downwardly away from a rear end of the single platform segment, wherein the vertical rear lip defines a proximal end of the vehicle tow platform; and an upwardly projecting wall segment positioned forward of the single platform segment, the upwardly projecting wall segment being adapted to block forward rolling of the wheeled vehicle, wherein the tow platform is of one-piece, metal construction having a substantially uniform thickness, and wherein the vehicle tow platform includes at least one opening disposed substantially along a longitudinal centerline of the vehicle tow platform to provide access to the trailer or dolly during use.

15. The vehicle tow platform as recited in claim 14, further comprising a tongue guard projecting upwardly away from the upwardly projecting wall segment, wherein the tongue guard includes a substantially vertical tongue segment having a length of at least about 12 inches.

16. The vehicle tow platform as recited in claim 15, further comprising an upper lip projecting away from the substantially vertical tongue segment in a direction towards the proximal end of the vehicle tow platform.

17. A vehicle tow platform adapted for mounting on a two-wheeled trailer or dolly, the vehicle tow platform comprising: a first platform segment adapted to support at least one rear wheel of a wheeled vehicle; a second platform segment adapted to support at least one forward wheel of the wheeled vehicle, wherein the second platform segment is depressed relative to the first platform segment such that the second platform segment is at a lower elevation than the first platform segment; a raised intermediate platform segment disposed in raised relation between the first platform segment and the second platform segment; a substantially vertical rear lip projecting downwardly away from a rear end of the first platform segment, wherein the vertical rear lip defines a proximal end of the vehicle tow platform; an upwardly projecting wall segment positioned forward of the first platform segment, the upwardly projecting wall segment being adapted to block forward rolling of the wheeled vehicle; and a tongue guard projecting upwardly away from the upwardly projecting wall segment, wherein the tongue guard includes a substantially vertical tongue segment having a length of at least about 12 inches, wherein the tow platform is of one-piece, metal construction having a substantially uniform thickness, and wherein the vehicle tow platform includes at least one opening disposed substantially along a longitudinal centerline of the vehicle tow platform to provide access to the trailer or dolly during use.

18. The vehicle tow platform as recited in claim 17, further comprising an upper lip projecting away from the substantially vertical tongue segment in a direction towards the proximal end of the vehicle tow platform.

* * * * *